UNITED STATES PATENT OFFICE.

GEORGE H. MERRILL, OF BOSTON, ASSIGNOR OF ONE-HALF HIS RIGHT TO JOHN D. PARKER, OF EVERETT, MASSACHUSETTS.

IMPROVEMENT IN AXLE-GREASE.

Specification forming part of Letters Patent No. 184,885, dated November 28, 1876; application filed October 28, 1876.

*To all whom it may concern:*

Be it known that I, GEORGE H. MERRILL, of the city of Boston, in the county of Suffolk and Commonwealth of Massachusetts, have made certain new and useful Improvements in Lubricating Car-Axle Grease; and I do hereby declare that the following is a full and clear description thereof.

This invention relates to a composition for keeping in condition car-axles, carriage-axles, and heavy machinery. It consists of a combination of different ingredients, as hereinafter described, to be applied as above.

To enable those skilled in the art to make and use my improved axle-grease, I will proceed to describe its construction and mode of application.

I take three-quarters of a pound of tallow, one gallon of tar, three-quarters of a pound of rosin, one-half gallon of lime-water, one and three-fifths ounce of whiting, two ounces of flaxseed-flour, and two ounces of Venetian red.

The above ingredients are thoroughly and properly mixed together, and the preparation is complete.

The mode of application will be readily understood without further explanation.

Having described my invention, what I claim is—

The combination of tallow, tar, lime-water, whiting, flaxseed-flour, Venetian red, and rosin, in the proportions and in the manner herein described, and for the purpose set forth.

GEO. H. MERRILL.

Witnesses:
   CHAS. J. SMITH,
   JOHN D. PARKER.